June 6, 1939.　　　D. K. PILKINGTON　　　2,161,429
POWER TRANSMISSION DEVICE
Filed April 17, 1936　　　2 Sheets-Sheet 1

INVENTOR
David K. Pilkington
BY
Austin & Dix
ATTORNEYS

June 6, 1939.

D. K. PILKINGTON 2,161,429

POWER TRANSMISSION DEVICE

Filed April 17, 1936

INVENTOR
David K. Pilkington
BY
ATTORNEYS

Patented June 6, 1939

2,161,429

UNITED STATES PATENT OFFICE 2,161,429

POWER TRANSMISSION DEVICE

David K. Pilkington, Sunbury-on-Thames, England, assignor, by mesne assignments, to Richard Lewis Woodhouse, Melbourne, Victoria, Australia Application April 17, 1936, Serial No. 74,856
In Great Britain May 9, 1935

4 Claims. (Cl. 74—242.9)

This invention relates to a power transmission device and particularly to the type wherein power is transmitted by a belt pulley having a geared connection with the shaft to be driven, and the belt pulley is supported by a floating carrier which can swing initially about the axis of the driven shaft to tighten the belt passing over the pulley.

Among the features of the present invention is the provision of an improved construction of power transmission device of this kind, which can be readily assembled and dismantled for repair and like purposes, or to change the ratio of the gearing to suit any particular conditions.

In the device according to the invention, the swinging carrier for the pulley may comprise a sleeve formed in sections, one of which sections has at one end a casing formed integrally or associated therewith. The casing houses the transmission gearing, which may comprise a pinion on the pulley shaft meshing with a gear wheel, in driving connection with the driven shaft. At the other end of the section there is a flange for attachment to a meeting flange on the other section. Each of the sections carries a bearing for the pulley shaft, one on each side of the pulley, and the pulley may be connected to its shaft by a suitable means such as a clutch of the expanding band type. The sleeve sections may comprise a main section and an end section, connected together, and by removing the end section, access is afforded to the pulley, clutch, bearings and other parts.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Figure 2:
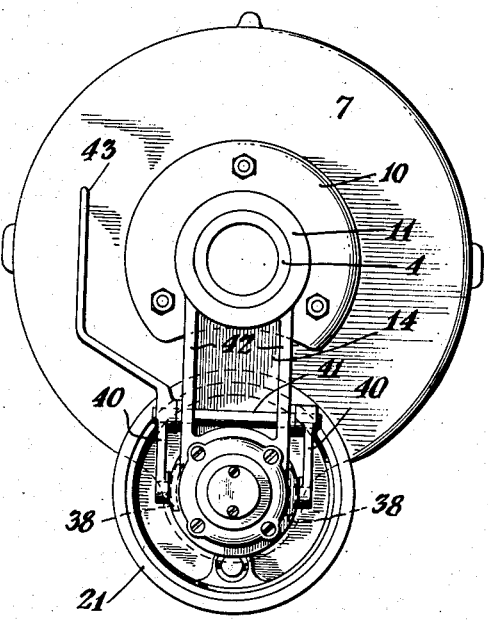
Fig. 2 is an elevational view of the device.

In the following description and in the claims, various details will be identified by specific names for convenience, but they are intended to be as generic in their application as the art will permit. Like reference characters denote like parts in the several figures of the drawings.

In the description of the invention and in the drawings accompanying and forming part of this specification, certain specific disclosure of the invention is made for purposes of explanation, but it will be understood that the details may be modified in various respects without departure from the broad aspect of the invention.

Referring now to the drawings, there is shown a main section 1 and an end section 2 of a carrier sleeve for a pulley shaft 3, which sleeve 1, 2 is adapted to be carried on an attaching sleeve 4 which may be slid on and secured by a set screw 4' to the shaft (not shown) of the machine (not shown) to be driven. The carrier sleeve 1, 2 is freely mounted on the attaching sleeve 4, so that the pulley shaft 3 can be swung about the axis of the attaching sleeve 4. A gunmetal bushing 4' may be interposed between the two sleeves. A gear wheel 5 is keyed on the attaching sleeve 4 and a pinion 6 is keyed on the pulley shaft 3 in mesh with the gear wheel 5.

Figure 1:
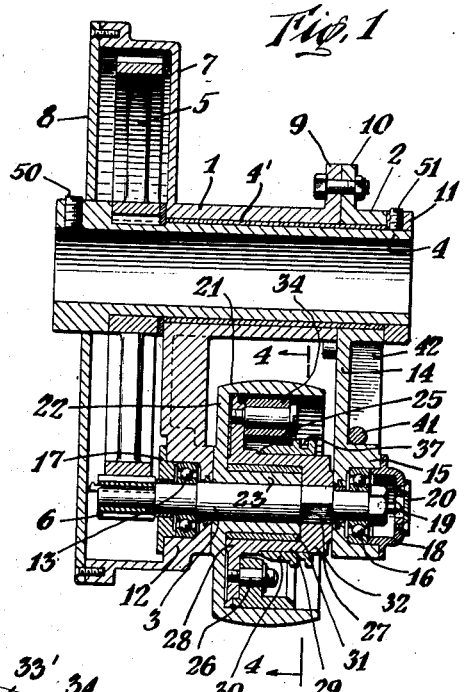
Fig. 1 is a view showing a section taken longitudinally along the axis of a device constructed according to the invention.

In the form of the invention shown in Figs. 1 and 2, the main section 1 of the carrier sleeve has a substantially circular housing or casing 7 formed integrally therewith at one end, to house the transmission gears 5 and 6, and the housing 7 is closed by a cover plate 8, which may be divided diametrically; the housing 7 may serve as a lubricant container. The other end of the main sleeve section 1 is provided with a flange 9 which may be bolted to a meeting flange 10 on the end section 2. A collar 11 may be fixed on the end of the attaching sleeve 4 by a set screw 11'.

The main section 1 of the carrier sleeve has a depending hollow boss 12, in which one bearing 13 for the pulley shaft 3 is fitted. The other end section 2 of the carrier sleeve has a depending girder-like portion 14, terminating in a hollow boss 15 in which another bearing 16 for the pulley shaft 3 is fitted.

The pulley shaft bearings 13 and 16 may be roller or ball bearings and may be closed in by removable end caps 17, 18 secured to the bosses 12 and 15. The pulley shaft 3 projects through the end cap 17 at one end to receive the pinion 6 and at the other end is provided with a lubricating nipple 19, the end cap 18 having a removable closing plate 20 permitting access to the nipple 19. The pulley shaft in this example may be formed with suitable channels (not shown) for lubricant.

The pulley 21 is closed on one side by a web 22 which bears against the bearing boss 12, the hub 23 being mounted freely on the shaft 3. Power is transmitted from the pulley 21 to the shaft 3 by a clutch which preferably is of the expanding band type and is housed in the pulley 21.

Figure 4:
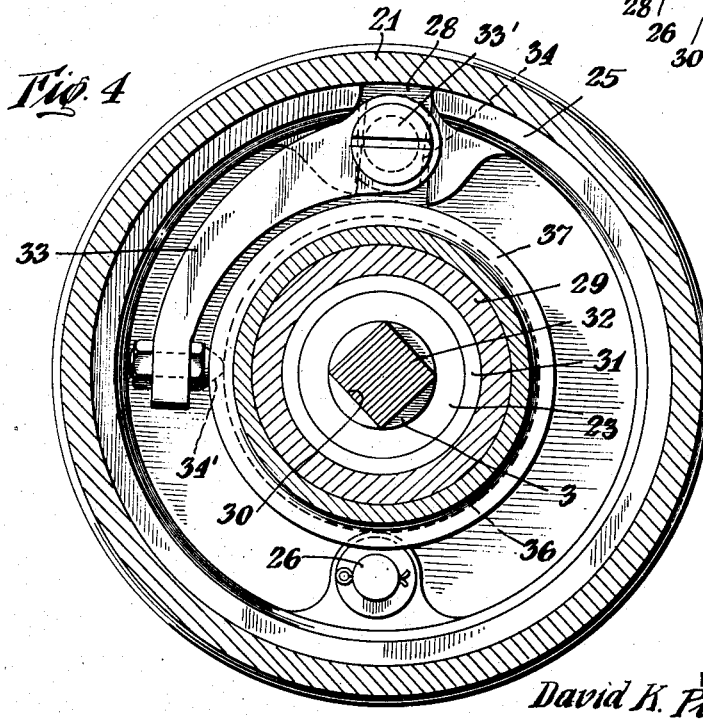
Fig. 4 is a view showing a section taken along line 4—4 of Fig. 1 and illustrating the clutch employed in both forms of construction.

Referring to Fig. 4, the clutch has an expanding band 25 which has a free or floating mounting on a pin 26, carried by a clutch hub centre 27.

The clutch centre 27 comprises a circular plate 28 provided with a hollow boss 29, which is closed at its end, and has a square hole 30 formed in the closed end. The clutch centre 27 is mounted on the pulley hub 23, a gun metal bushing 31 being interposed between the hub 23 and the clutch centre 27. The pulley shaft 3 has a squared portion 32 which engages in the square hole 30 in the clutch centre 27. A curved lever 33 is pivotally mounted by a pin 33' on the circular plate 28, which lever carries a hardened pin 34' near its free end. The curved lever 33 is provided with a projecting cam or elongated block 34 at its pivoted end, this block being normally situated between the ends of the expanding band 25 of the clutch.

In the declutched position, the pin 34' on the lever 33, lies in the path of a sliding cone 36, which is mounted to slide on the boss 29 of the clutch centre 27. When the sliding cone 36 is moved into the clutch-engaging position, it bears against the pin 34', and moves the curved lever 33 about its pivot 33', thereby causing the cam or block 34 to turn and force the ends of the expanding band 25 apart, thus engaging said band with the inner circumferential face of the pulley 21. The pulley 21 is thereby clutched to its shaft 3.

In a clutch so constructed, the expanding band 25 is effective from end to end. By changing or adjusting the block or cam 34, the gripping action of the band 25 can be varied to suit the power to be transmitted.

For the purpose of sliding the cone 36, it is provided with an annular groove 37, or with spaced circular flanges, in or between which are received arcuate shoes 38 (Fig. 2) carried by a pivoted fork. The fork may comprise a pair of arms 40 fixed on a spindle 41, which is rotatably mounted in spaced webs 42 formed on the extension 14 of the end section 2. An operating lever 43 which may be formed as a crank is secured to the spindle 41.

If desired, the clutch may be so designed that it will slip when a predetermined maximum torque is applied thereto, thus, if a predetermined overload is developed, the clutch will slip and prevent breaking of the belt or other portions of the mechanism.

Figure 3:
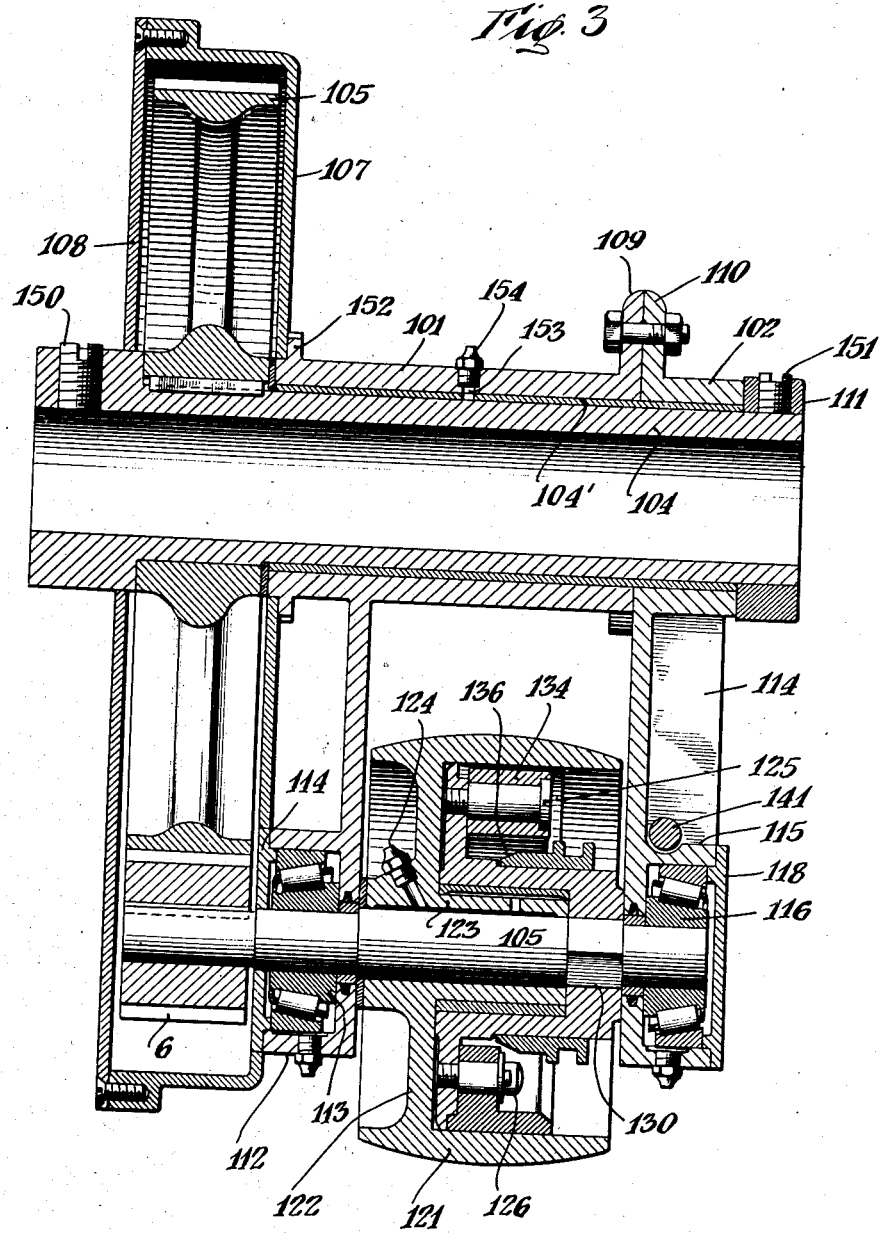
Fig. 3 is a view similar to Fig. 1, only showing a slightly modified form of the invention.

Referring now to Fig. 3, the modified construction may be generally similar to that thus far described. However, certain modifications may be made, as indicated in Fig. 3.

The sleeve 101 may be formed in a manner generally similar to the sleeve 1 of Fig. 1, except that the gear housing 107 may be formed as a separate member and may abut a flange 152 on the sleeve 101. The sleeve 101 may have a lubricating opening 153 and nipple 154.

The depending bars 112 and arm 114 may have a slightly different form than the corresponding bars and arm 14 of Fig. 1 of the first form and closing caps 117 and 118 may be of slightly different form. The bearings 113 and 116, although shown as roller bearings, may be ball bearings if desired.

The hub 123 of the pulley 121 extends beyond the web 122 and a lubricating nipple 124 may be fitted in the extension.

The device shown in Fig. 1 may be assembled readily and may be mounted on a shaft (not shown) to be driven, by sliding the sleeve 4 onto the shaft and then tightening the set screw 50. A belt (not shown) may be trained over the pulley 21.

Now, when power is transmitted by the belt (not shown) from a driving unit (not shown) to the belt pulley 21, the pinion 6 first makes an epicyclic movement about the gear wheel 5, thereby causing the carrier sleeve 1, 2 to swing about the sleeve 4. This swinging movement tightens the belt, whereupon the drive is transmitted by the pinion 6 to the gear wheel 5 in the normal manner, the belt being automatically tensioned to suit the load. The other form of the device may be attached and operated in a similar manner.

From the foregoing, it will be seen that the device is one which can be easily constructed and assembled, and which can be quickly and easily unassembled for adjustment or repair. The two-part carrier makes such assembly and disassembly particularly easy. Thorough lubrication of the parts is provided by the housing 7 (or 107) and the several lubricating nipples.

While certain novel features of the invention have been disclosed and are pointed out in the annexed claims, it will be understood that various omissions, substitutions and changes may be made by those skilled in the art without departing from the spirit of the invention.

What I claim is:

1. A belt gear comprising a pulley, a shaft therefor, a driving element for attachment to the shaft of a machine to be driven, a carrier for said pulley shaft mounted to swing on said driving element, said carrier embodying a sleeve formed in sections connected together, a gear casing at the end of one of said sections, bearings for said pulley shaft, bearing supports carried by said sections, transmission gearing between said shaft and said driving element, said transmission gearing being housed in said gear casing, and a clutch between said pulley and said pulley shaft.

2. A belt gear comprising a pulley, a shaft therefor, a driving sleeve for attachment to the shaft of a machine to be driven, a carrier for said pulley shaft mounted to swing about said driving sleeve, said carrier embodying a sleeve formed in two sections, one a main section and the other an end section, connecting flanges at the meeting ends of said sections a gear casing at the other end of said main section, bearings for said pulley shaft arranged one on each side of said pulley, housings for said bearings, said housings being supported by said sections, a gear wheel fixed to said driving sleeve, a pinion on said pulley shaft, meshing with said gear wheel, said pinion and gear wheel being housed in said gear casing, and a clutch of the expanding band type between said pulley and said pulley shaft.

3. A belt gear comprising a pulley, a shaft therefor, a driving sleeve for attachment to the shaft of a machine to be driven, a carrier for said pulley shaft, mounted to swing about said driving sleeve, said carrier embodying a sleeve formed in two sections, one a main section and the other an end section, attaching flanges at the meeting ends of said sections, a gear casing at the other end of said main section, a removable end cover for said gear casing, bearings for said pulley shaft arranged one on each side of said pulley, housings for said bearings, supports for said housings depending from said sections, closing caps for said housings, a gear wheel fixed to said driving sleeve, a pinion on said pulley shaft, meshing with said gear wheel, said pinion and gear wheel being housed in said gear casing and a clutch between said pulley and said pulley shaft, said clutch embodying a clutch centre in driving connection with said pulley shaft, an expansible band pivotally supported on said clutch centre for frictional engagement with the pulley rim, an adjustable cam element between the ends of said band, and means for adjusting said cam element to expand and release said band.

4. In a power transmitting apparatus, a unitary assembly comprising an attaching sleeve adapted to be attached to a supporting shaft, a gear fixedly secured to said attaching sleeve, a swingable carrier comprising first and second outer sleeves bolted together end to end and loosely mounted on said attaching sleeve for swinging movement thereabout, said outer sleeves having, respectively, depending first and second arms, each arm having a housing in the lower end thereof, bearings in said housings, a pulley shaft journalled in said bearings, a pulley secured to said pulley shaft between said arms, a pinion meshing with said gear and overhung on said pulley shaft beyond said first arm, said first arm having associated therewith a casing body enclosing both said gear and said pinion, and a removable end plate attached to said casing body.

DAVID K. PILKINGTON.